US 6,601,472 B1

(12) United States Patent
Baron

(10) Patent No.: US 6,601,472 B1
(45) Date of Patent: Aug. 5, 2003

(54) TORSIONAL VIBRATION DAMPER

(75) Inventor: Joachim Baron, Hannover (DE)

(73) Assignee: Universitaet Hannover, Hannover (DE)

(*) Notice: Subject to any disclaimer, the term of this patent is extended or adjusted under 35 U.S.C. 154(b) by 0 days.

(21) Appl. No.: 09/913,936

(22) PCT Filed: Feb. 15, 2000

(86) PCT No.: PCT/DE00/00422
§ 371 (c)(1),
(2), (4) Date: Dec. 18, 2001

(87) PCT Pub. No.: WO00/49310
PCT Pub. Date: Aug. 24, 2000

(30) Foreign Application Priority Data

Feb. 19, 1999 (DE) .......................... 199 07 216

(51) Int. Cl.[7] .............................................. F16F 15/121
(52) U.S. Cl. ........................................ 74/574; 74/573 R
(58) Field of Search .............................. 74/574, 573 R; 192/30 V

(56) References Cited

U.S. PATENT DOCUMENTS

| 2,062,369 A | * | 12/1936 | Meyer ........................... 74/574 |
| 2,367,709 A | * | 1/1945 | Arkus-Duntov et al. ...... 74/574 |
| 2,411,373 A | * | 11/1946 | Holowenko .................... 74/574 |
| 3,611,831 A | * | 10/1971 | O'Neill ........................ 74/574 |
| 4,735,180 A | * | 4/1988 | Kramer ....................... 123/364 |
| 4,779,483 A | * | 10/1988 | Andra et al. ................... 74/574 |
| 4,825,718 A | * | 5/1989 | Seifert et al. .................. 74/574 |
| 4,935,651 A | | 6/1990 | Hong et al. ................... 310/51 |
| 5,036,726 A | * | 8/1991 | Wolf et al. ..................... 74/574 |
| 5,655,416 A | * | 8/1997 | Mott et al. ..................... 74/574 |
| 5,666,862 A | * | 9/1997 | Eckel et al. .................... 74/574 |
| 5,681,221 A | * | 10/1997 | Albers et al. ................. 464/67 |
| 5,735,768 A | * | 4/1998 | Sudau ......................... 475/347 |
| 5,935,007 A | * | 8/1999 | Yang ............................ 464/24 |
| 6,110,046 A | * | 8/2000 | Rohs et al. .................... 464/66 |

FOREIGN PATENT DOCUMENTS

| CZ | 71478 | * | 11/1942 |
| DE | 632057 | | 7/1936 |
| DE | 19631989 | | 9/1977 |
| DE | 0263332 | * | 12/1988 |
| DE | 19538722 | | 4/1997 |
| EP | 0062154 | | 10/1982 |
| EP | 000508790 | * | 10/1992 |
| EP | 0651177 | | 5/1995 |
| JP | 0182651 | * | 5/1989 |
| SU | 0926543 | * | 5/1982 |
| SU | 0991083 | * | 1/1983 |
| SU | 001709143 | * | 1/1992 |

OTHER PUBLICATIONS

Copy of the International Search Report.

* cited by examiner

Primary Examiner—Chong H. Kim
Assistant Examiner—Julie K. Smith
(74) Attorney, Agent, or Firm—Crowell & Moring LLP

(57) ABSTRACT

A torsional vibration damper (1) with an adjustable resonance frequency. The damper has a support plate (2) arranged on a rotating shaft (3). A flexural spring arrangement (5) is mounted on the support plate (2) with a fixed inner end (6) and extends radially outwardly to an inertial mass (11). A support for the flexural spring arrangement (5) is provided constructed as at least one movable slide element (8) arranged in a radial guide (7). A restoring spring (16) exerts a restoring force on the movable slide element (8) in a direction opposite to the centrifugal force resulting from rotation of the shaft (3). The position of the slide element (8) on the flexural spring (5) is influenced by the centrifugal force and the restoring force. The magnitude of the restoring force is varied as a function of the rotational speed of the shaft such that the position of the slide element (8) moves to automatically adapt the resonance frequency of the torsional vibration damper (1) to the speed of rotation of the shaft (3).

14 Claims, 2 Drawing Sheets

TORSIONAL VIBRATION DAMPER

BACKGROUND OF THE INVENTION

The invention relates to a torsional vibration damper with variable resonance frequency.

Components in machines and equipment including, in particular, rotating components, can be excited into undesirable torsional vibration through periodic pulsating torques. These torsional vibrations, which are superimposed on the desired uniform rotary motion, can interfere with the synchronous running of groups of units and can lead to excessive stresses, particularly in the resonance ranges.

It is already known in the art to limit harmful torsional vibrations by means of torsional vibration dampers. These torsional vibration dampers are adjusted in such a way that they dampen excitation torques with a specific frequency. If the excitation torques occurring in the machines or the equipment have a frequency that is proportional to the variable operating speed of the components, the frequency of the torsional vibration damper is adjusted to a resonance point with a particularly high load. The torsional vibration damper is then not effective at other operating speeds. Such a torsional vibration damper is described, for instance, in DE 43 35 766 A1.

For machines and equipment with variable rotational speed, it is desirable, however, to achieve damping of the excitation torques over the entire rotational speed range. In this connection, DE 196 31 989 has already described the use of pendulum oscillators. Such pendulum oscillators consist, for instance, of rollers or oscillating rings that move in orbits inside hollow cylinders. These solutions have the drawback, however, that an effective embodiment requires a significant size, which substantially limits their applicability.

DE 196 41 763 discloses a straight-motion vibration damper in which an inertial mass is fixedly connected with a free end of a leaf spring, for which an adjustable support element is provided to change the effective length of the leaf spring and thereby to make the resonance frequency of the vibration damper adjustable. Here, the support is adjusted by means of a control unit with a sensor for detecting the excitation frequency and an electric motor. This is a comparatively complex electrical solution. Moreover, the vibration damper is not suitable for use as a torsional vibration damper.

Furthermore, DE Patent 632 057 discloses a torsional vibration damper, which has a support plate mounted to a rotating shaft on which a flexural spring arrangement is disposed and guided radially outwardly to an inertial mass. The inner end of the flexural spring arrangement is fixed by clamping. Supports constructed as slide elements, which are arranged in radial guides of the support plate and execute a back and forth movement during each rotation, are provided on the flexural spring arrangement. Through the position of these slide elements, the natural frequency of the connection between the rotating shaft and the inertial mass is changed in a continuously varying and periodic manner in the course of each rotation. As a result the shaft never runs with natural frequencies that harmonize with its own rotational speed for more than very short periods. However, this continuous variation of the natural frequency only achieves that the torsional vibrations of a shaft cannot reach their full amplitude.

SUMMARY OF THE INVENTION

The object of the invention is to provide a torsional vibration damper with a simple structure that makes it possible to dampen excitation torques over the entire rotational speed range.

This object according to the invention is attained by the invention as described and claimed hereinafter. Preferred embodiments also are set forth.

The invention provides that the torsional vibration damper has a support plate fixed to a rotating shaft on which is disposed a flexural spring arrangement guided radially outwardly to an inertial mass and the inner end of the flexural spring arrangement is fixed by clamping. On the flexural spring arrangement a support is provided, which is constructed as at least one slide element arranged in a radial guide element of the support plate. A restoring force of a restoring spring, which acts in a direction opposite the centrifugal force that results from a rotational movement, is applied to the slide element. The slide element, under the influence of the centrifugal force and the restoring force, can be radially moved in the guiding element. Means are provided with which the restoring force acting in the direction opposite the centrifugal force can be changed as a function of the speed of rotation in such a way that the resonance frequency of the torsional vibration damper can be automatically adjusted to the rotational speed by the position of the slide element.

According to a preferred embodiment of the invention, the means with which the restoring force acting in the direction opposite the centrifugal force can be changed as a function of the speed of rotation are provided between the restoring spring and the at least one slide element. Consequently, based on the respectively acting centrifugal force, the magnitude of which depends on the centrifugal radius and the rotational speed, the slide element assumes a respective position on the flexural spring. This results in an effective length of the flexural spring, which defines a resonance of the torsional vibration damper required for a given rotational speed.

In the context of the invention, it is further provided that the flexural spring arrangement may comprise two opposite flexural springs extending radially outwardly from the support plate to the inertial mass, each with a slide element arranged in its radial guide element. This results in a balanced, simple construction of the torsional vibration damper.

It is furthermore provided that the slide elements can be arranged with a support guide on the flexural springs in a manner such that they span the springs and can slide along them, and that the flexural springs can be constructed as leaf springs.

Preferably, the means for rotational speed-dependent intensification of the restoring force of the restoring spring is provided with a tie member. The tie member extends to at least one slide element from a free base point of the restoring spring which can be displaced in a spring guide element perpendicularly to the guide element of the slide elements. In the rest position or at low rotational speeds, the tie member engages with the free end of the restoring spring at an acute angle and with the slide element at an obtuse angle, and with increasing speed of rotation it engages with the free end of the restoring spring at an increasingly larger angle and with the slide element at an increasingly smaller angle, such that the restoring force acting in opposite direction of the centrifugal force can be automatically changed as a function of the speed of rotation, and the slide element assumes a respective position on the flexural spring, from which results a resonance frequency corresponding to the rotational speed.

It may also be provided that both base points of the restoring spring constructed as a compression spring are displaceably guided in two spring guide elements extending perpendicularly to the guide element of the slide elements and that the base points are connected with the slide elements via two tie members each.

Preferably, the restoring spring furthermore has a linear characteristic and is constructed as a helical spring.

According to another embodiment of the invention, it may be provided that the means for the rotational speed-dependent intensification of the restoring force is a tie member mounted to the slide element. This tie member is extended to a cam plate, which is operatively connected with a restoring spring constructed as a spiral spring, such that the restoring force acting on the slide elements is intensified with increasing speed of rotation as a function of the rotation angle of the cam plate. In this case, the tie member is preferably guided to the slide element in a deflected manner via a deflecting sheave in the motion direction of the slide element.

It may be advantageous if two restoring springs, each with a slide element, are arranged opposite one another and a tie member extending to a cam plate is associated with each slide element.

BRIEF DESCRIPTION OF THE DRAWINGS

Two working embodiments are illustrated in the drawings and will be described in further detail in the following.

DETAILED DESCRIPTION OF PREFERRED EMBODIMENTS

Figure 1:
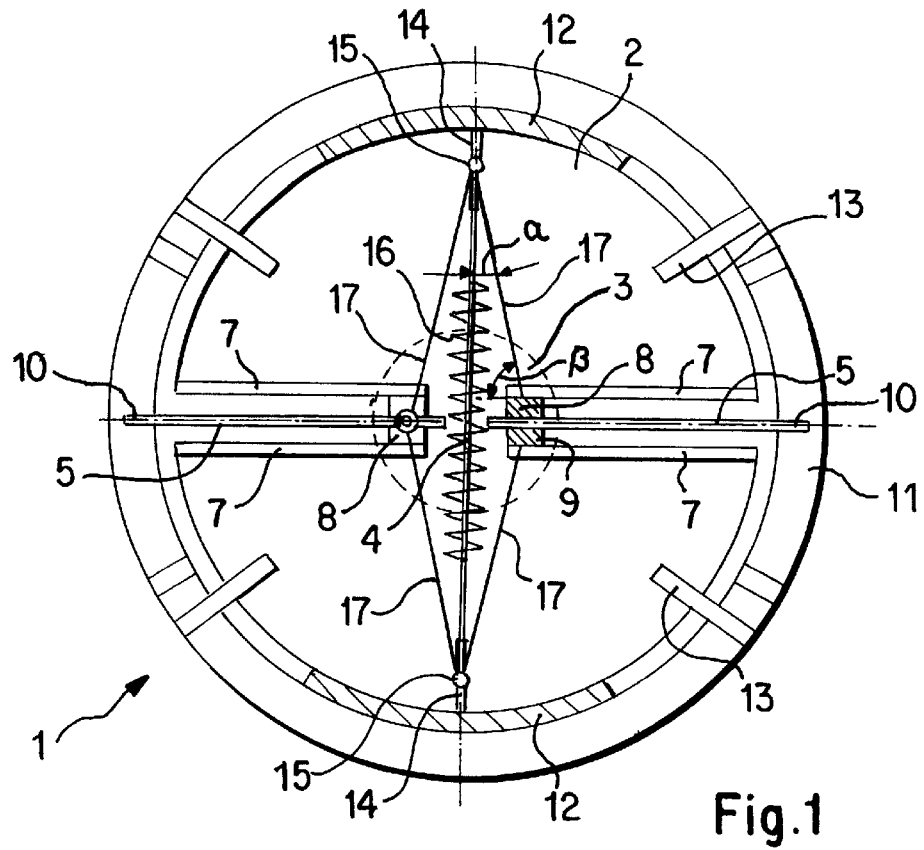
FIG. 1 shows a torsional vibration damper with a tie member extending from the free base point of the restoring spring to the slide element, with the inertial masses in the rest position.

In the drawing, 1 identifies a torsional vibration damper. This torsional vibration damper 1 has a support plate 2, which is non-rotatably arranged on a shaft 3 whose torsional vibrations are to be damped by means of the torsional vibration damper 1. Near a rotary axis 4 of the support plate 2, the inner ends 6 of two radially outwardly extending flexural springs 5 are fixed in the support plate by being clamped in recesses (not shown).

The support plate 2 in the area of the flexural spring 5 is provided with radially outwardly guided guide elements 7 in which slide elements 8 are arranged so that they can be moved in radial direction. The slide elements 8 with a support guide 9 are adjustably arranged on the flexural springs 5. The support guide 9 on the flexural springs 5 acts as a clamping element.

The flexural springs 5 with their outer ends 10 are guided to an inertial mass 11 and are fixed there. The inertial mass 11 is arranged in bearing shells 12 on support plate 2 in such a way that it can be pivoted around the support plate 2. Stops 13 mounted to the support plate 2 limit the possible pivoting movement of the inertial mass 11.

Figure 2:
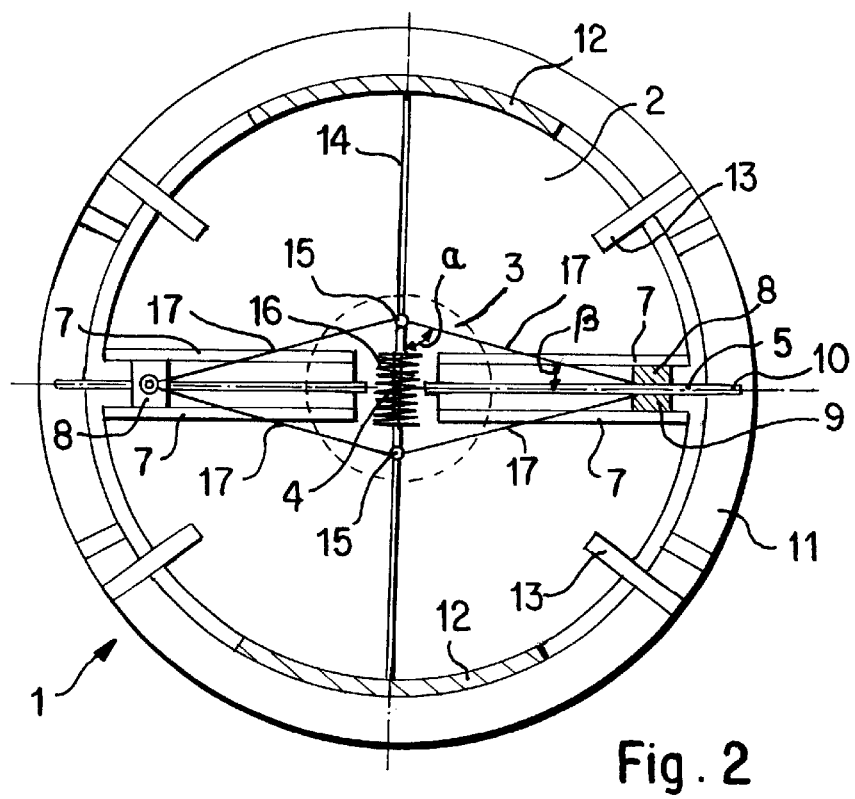
FIG. 2 shows the torsional vibration damper according to FIG. 1, whose inertial masses are in their maximum active position.

In FIGS. 1 and 2 of the drawing, the two base points 15 of a restoring spring 16 constructed as a compression spring for the slide elements 8 are displaceably guided in two spring guide elements 14 which are arranged on the support plate 2 perpendicularly to the guide element of the slide elements 8. From the base points 15 of the restoring spring 16, tie members 17 are guided to the slide elements 8. The restoring force of the restoring spring 16 acts on the slide elements 8 via tie members 17.

FIG. 1 of the drawing depicts the torsional vibration damper 1 in its initial position in which the shaft 3 stands still or rotates only at a low speed of rotation. Here, the effective force of the restoring spring 16 holds the slide elements 8 in or near their radially inner end position via the tie members 17. Consequently, the flexural springs 5 are clamped in the support guides 9 of the slide elements 8 near their inner ends 6, so that a maximum effective length l of the flexural springs 5 results. Here, the tie members 17 engage with the base points 15 of the restoring spring 16 at an acute angle α and with the slide elements 8 at an obtuse angle β. These angle ratios have the result that at low speeds of the shaft 3, even low centrifugal forces acting on the slide elements 8 are able to move the slide elements outwardly from their inner end position on the flexural spring 5 against the restoring force of the restoring spring 16.

With increasing rotational speed of shaft 3, the tie members 17 then engage with the base points 15 of the restoring spring 16 at a continuously increasing angle α and with the slide elements 8 at a continuously decreasing angle until the end position of the slide elements 8 depicted in FIG. 2 is finally reached. Here, the tie members 17 engage with the base points 15 of the restoring spring 16 at an acute angle α' and with the slide elements 8 at an obtuse angle β'. From the attack angles of the tie members 17, which are variable with the speed-dependent movement of the cross members 8 and the base points 15, results a speed dependent conversion of the restoring force of the adjusting spring 16 acting on the slide elements 8. As the restoring force acting on the slide elements 8 increases, the acting centrifugal force also increases with increasing rotational speed. This has the effect that, an automatic rotational speed-dependent adjustment of the position of the slide elements 8, which is required to achieve the correct resonance frequency, results from the balance of the forces via the effective length l of the flexural spring 5.

Figure 3:
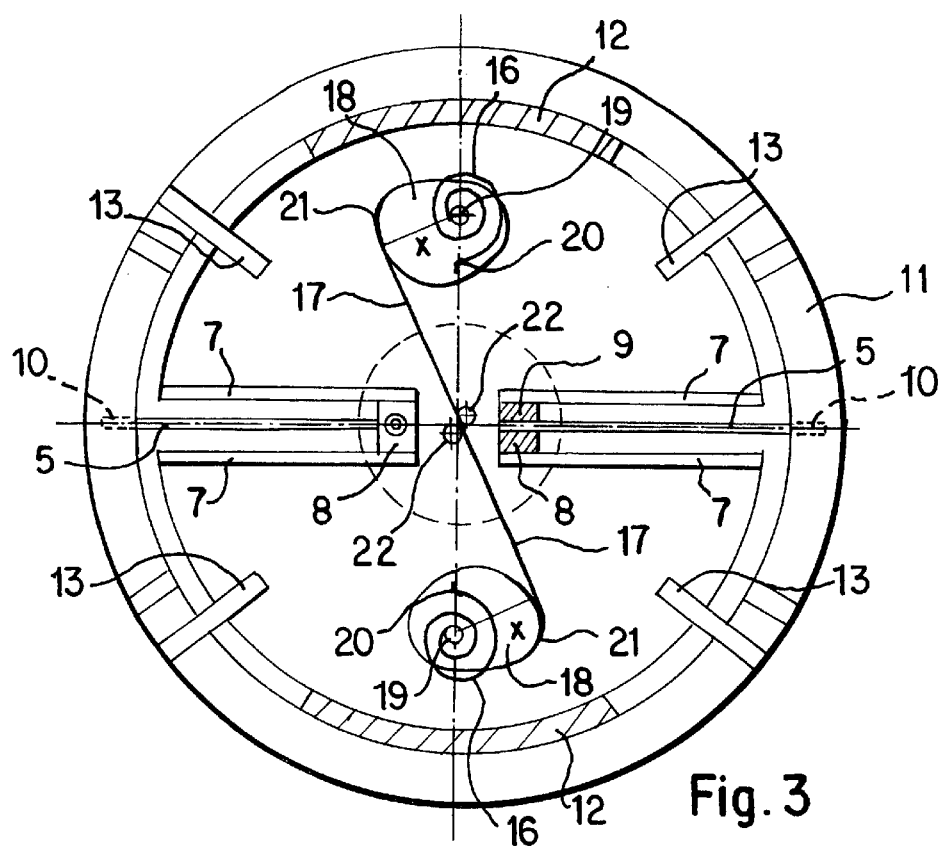
FIG. 3 depicts a torsional vibration damper with a tie member extending to a cam plate whose inertial masses are in the rest position.
Figure 4:
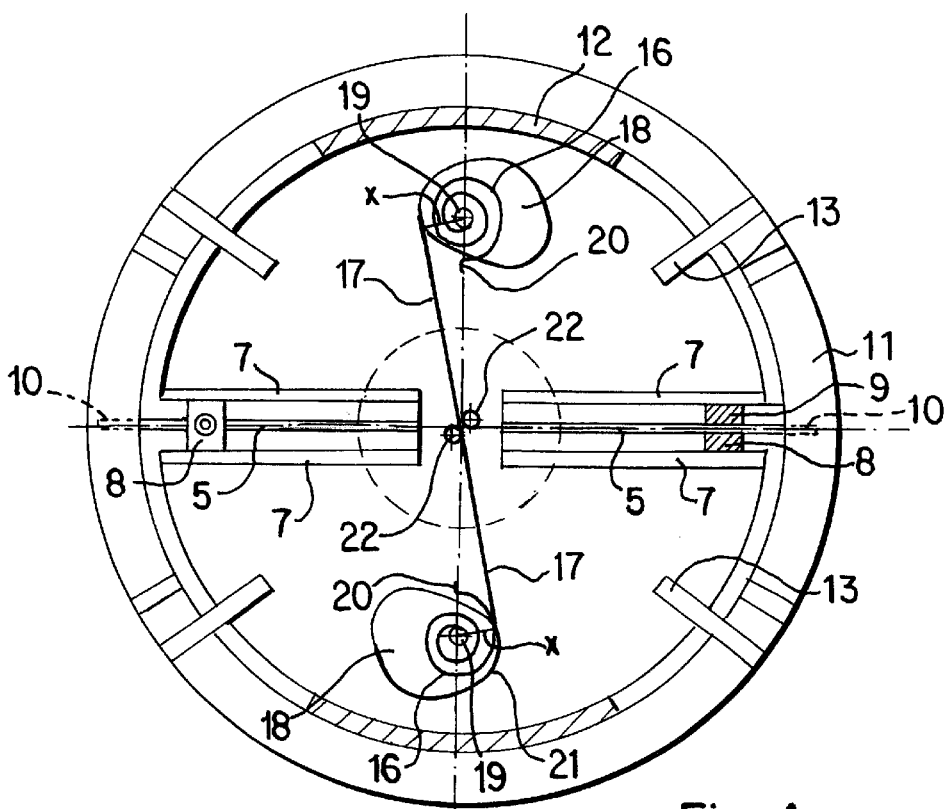
FIG. 4 shows the torsional vibration damper according to FIG. 3 whose inertial masses are in their maximum active position.

According to the illustrative embodiment depicted in FIGS. 3 and 4 of the drawing, the torsional vibration damper 1 has two cam plates 18, which are arranged on a shaft 19 so that they are rotatable against the force of a restoring spring 16, which is constructed as a spiral spring. The restoring spring 16 engages with each shaft 19 of the cam plates 18, while the outer ends 20 of the restoring spring 16 are fixed to the support plate 2. The tie members 17 extend from the circumference 21 of the cam plate 18 via a respective deflection sheave 22 to the slide elements 8 in the movement direction of the slide elements.

FIG. 3 of the drawing depicts the torsional vibration damper 1 in its initial position in which t he shaft 3 is idle or rotates only at a low speed of rotation. Here, the effective force of the restoring spring 16 holds the slide elements 8 in or near their radially inner end position via the tie members 17. Consequently, the flexural springs 5 are clamped into the support guides 9 of the slide elements 8 near their inner ends 6, so that a maximum effective length l of the flexural springs 5 results. Here, the tie members 17 of the slide elements 8 engage with the circumference 21 of the cam plates 18 in the area of a large radius, so that the restoring force of the restoring spring 16 acts via a along lever X. The long lever X has the effect that at low speeds of shaft 3 small centrifugal forces already acting on the slide elements 8 area capable of moving the slide elements outwardly from their inner end position on the flexural springs 5 against the restoring force of the restoring spring 16.

With increasing rotational speed of the shaft 3, due to the increasing action of centrifugal forces and the resultant outward movement of the slide elements 8 in their guide elements 7, the cam plates 18 are increasingly rotated against the forces of the restoring springs 16. As a consequence, the tie members 17 engage with the cam plates 18 within the area of the increasingly smaller radii until the end position of the slide elements 8 depicted in FIG. 4 is finally reached. From the lever arms X of the cam plates 18, which act variably with the speed dependent movement of the slide elements 8, results a speed dependent conversion of the restoring force of the restoring spring 16 acting on the slide elements 8. As the restoring force acting on the slide elements 8 increases, the acting centrifugal force also increases with increasing speed of rotation. This has the effect that an automatic speed-dependent adjustment of the position of the slide elements 8 required to achieve the correct resonance frequency results automatically from the balance of the forces via the effective length l of the flexural spring 5.

What is claimed is:

1. A torsional vibration damper having a variable resonance frequency, comprising a support plate mounted to a rotating shaft, a flexural spring arrangement disposed on said support plate, said spring arrangement having a fixed inner end and extending radially outwardly to an inertial mass on said support plate, said spring arrangement further comprising at least one slide element arranged in a radial guide element on the support plate, each said at least one slide element being engaged by a restoring spring which exerts a restoring force on said at least one slide element in a direction opposite to a centrifugal force resulting from rotation of said shaft, said at least one slide element being radially movable in said guide element by said centrifugal force and said restoring force, wherein the restoring force of said restoring spring is varied as a function of the rotational speed of said shaft in such a way that the slide element is positioned to adjust the resonance frequency of the torsional vibration damper to the rotational speed of the shaft.

2. A torsional vibration damper according to claim 1, wherein the restoring force of said restoring spring is varied by means provided between the restoring spring and the at least one slide element.

3. A torsional vibration damper according to claim 1, wherein the flexural spring arrangement comprises two, oppositely arranged flexural springs on the support plate which extend radially outwardly to said inertial mass, each said flexural spring carrying a respective slide element arranged in a radial guide element.

4. A torsional vibration damper according to claim 1, wherein slide elements are arranged with a support guide on the flexural springs such that they span the flexural springs and can slide along the flexural springs.

5. A torsional vibration damper according to claim 1, wherein the flexural springs are constructed as leaf springs.

6. A torsional vibration damper according to claim 1, wherein the rotational speed-dependent adjustment of the restoring force of the restoring spring is effected by a tie member that extends between the at least one slide element and a free base point of the restoring spring, said free base point being displaceably guided in a spring guide perpendicular to the radial guide element of the at least one slide element, wherein when said shaft is stopped or rotating at low speed, said tie member meets the free base point of the restoring spring at an acute angle ($\alpha$) and the at least one slide element at an obtuse angle ($\beta$), and as the shaft rotational speed increases, meets the free base point of the restoring spring at an increasingly larger angle ($\alpha'$) and the at least one slide element at an increasingly smaller angle ($\beta'$), such that the restoring force acting opposite the centrifugal force varies automatically as a function of the shaft rotational speed, and the slide element assumes a respective position on the flexural spring at which there results a resonance frequency matched to the shaft rotational speed.

7. A torsional vibration damper according to claim 1, wherein the restoring spring comprises a compression spring displaceably guided in two spring guide elements which extend perpendicular to the radial guide elements of two slide elements, said restoring spring having a free base point at each end thereof, and the free base points each being connected with two slide elements via respective tie members.

8. A torsional vibration damper according to claim 1, wherein the restoring spring has a linear spring characteristic.

9. A torsional vibration damper according to claim 1, wherein the restoring spring comprises a helical spring.

10. A torsional vibration damper according to claim 1, wherein the restoring force exerted by the restoring spring is intensified as the shaft rotational speed increases.

11. A torsional vibration damper according to claim 1, wherein the rotational speed-dependent adjustment of the restoring force of the restoring spring is effected by a tie member that extends between the at least one slide element and a pivotable cam plate, said cam plate being engaged by a spiral restoring spring such that as the rotational speed of the shaft increases, the restoring force exerted on the at least one slide element is intensified as a function of the position of the pivotable cam plate.

12. A torsional vibration damper according to claim 11, further comprising a deflection member around which said tie member is deflected between the slide element and the cam plate such that the tie member is substantially aligned between the deflection member and the slide element with the movement direction of the slide element.

13. A torsional vibration damper according to claim 11, wherein the restoring force is exerted by two spiral restoring springs arranged on opposite sides of the vibration damper, each spiral spring being connected to a respective cam plate, and each cam plate in turn being connected by a tie member to a respective slide element.

14. A torsional vibration damper according to claim 11, wherein the restoring force exerted by the restoring spring is intensified as the shaft rotational speed increases.

\* \* \* \* \*